(12) United States Patent
Bell

(10) Patent No.: US 7,096,033 B1
(45) Date of Patent: Aug. 22, 2006

(54) MOBILE APPARATUS ENABLING INTER-NETWORK COMMUNICATION

(75) Inventor: John Richardson Bell, Fremont, CA (US)

(73) Assignee: Koninkiljke Phillips Electronics N.V., Eindhoven (NL)

( * ) Notice: Subject to any disclaimer, the term of this patent is extended or adjusted under 35 U.S.C. 154(b) by 1278 days.

(21) Appl. No.: 09/618,190

(22) Filed: Jul. 18, 2000

(51) Int. Cl.
H04M 3/00 (2006.01)

(52) U.S. Cl. .................. 455/519; 455/518; 455/566; 455/567; 463/41; 463/40; 463/39

(58) Field of Classification Search ............. 455/419, 455/418, 566, 567, 552.1, 553.1; 463/40, 463/39
See application file for complete search history.

(56) References Cited

U.S. PATENT DOCUMENTS

| 5,946,629 | A |   | 8/1999 | Sawyer et al. |
| 5,956,651 | A | * | 9/1999 | Willkie et al. ............ 455/553.1 |
| 6,134,437 | A | * | 10/2000 | Karabinis et al. ............ 455/427 |
| 6,301,338 | B1 | * | 10/2001 | Makela et al. ............ 379/88.21 |
| 6,524,189 | B1 | * | 2/2003 | Rautila .................... 463/40 |
| 6,633,759 | B1 | * | 10/2003 | Kobayashi ............... 455/419 |

FOREIGN PATENT DOCUMENTS

| DE | 19846952 | 4/2000 |
| EP | 0896488 | 2/1999 |
| WO | WO0117210 | 3/2000 |

OTHER PUBLICATIONS

"Specification for IR Mobile Communications", Version 1.1, Mar. 1999, pp. 73–81.

"IR Object Exchange Protocol", Version 1.2, Mar. 1999, pp. 68–70.

* cited by examiner

Primary Examiner—William Trost
Assistant Examiner—Danh Le
(74) Attorney, Agent, or Firm—Kevin Fortin

(57) ABSTRACT

A mobile apparatus is provided for exchanging data objects over several network. The mobile apparatus exchanges data objects of a first data format over a first network and exchanges data of a second data format over a second network. The mobile apparatus comprises configurable processing means. When configured, processing means converts data of the first format received from the first network to data of the second format. Processing means then forwards converted data to the second network.

9 Claims, 2 Drawing Sheets

MOBILE APPARATUS ENABLING INTER-NETWORK COMMUNICATION

FIELD OF THE INVENTION

The invention relates to a mobile apparatus for communicating over at least two networks. The invention also relates to a communication system providing inter-network communication.

The invention is relevant to radio telephony applications. The invention permits to exchange data objects, e.g. messages, from one network to the other.

BACKGROUND ART

The increasing number of hand-held communicating devices has made clear the need to provide wireless connectivity. Therefore standards are developed to define communication over Wireless Local Area Networks (WLAN) and Wireless Personal Area Networks (WPAN).

The Infrared Data Association (IrDA) defines standards for short-range infrared wireless communications. The IrDA has defined several data protocols among which are the IrMC (IR Mobile Communications protocol) and the IrOBEX (Object Exchange Protocol). The IrMC specification, "Specification for IR Mobile Communications", Version 1.1, March 1999, defines the rules for utilization of IR in wireless communications equipment e.g. mobile handsets, PCs, notebooks, PDAS, cellular phones. On pp. 73–81, the IrMC specification specifically enables objects exchange between a variety of applications and, for example, enables the exchange of text messages defined as vMessages between messaging applications. The IrOBEX specification "IR Object Exchange protocol", Version 1.2, March 1999, defines the exchange of data objects, such as the vMessages defined in the IrMC specification, from one device to another. On pp. 68–70, the IrOBEX specification defines profiles of data objects and particularly vMessages. The OBEX protocol may also be utilized by the Bluetooth technology enabling the possibility to use either the Bluetooth radio technology or the IrDA IR-technology.

U.S. Pat. No. 5,946,629 relates to inter-network message communication. This document discloses functionality in a message center of a cellular telecommunications network for performing inter-network message communication. With respect to an SMS message originated from a mobile station, the message center analyzes the received message to identify both a designated message delivery network and a destination address on that designated network for message delivery. The message is then re-formatted for transmission on the designated network, and forwarded in the proper format to the identified destination address via the designated network. With respect to a message originated on a network other than the cellular network, the message center analyzes the received message to identify a subscriber mobile station destination on the cellular network for message delivery. The received message is then re-formatted for transmission on the cellular network, and forwarded in the SMS message format to the identified subscriber mobile station via the cellular network.

SUMMARY OF THE INVENTION

It is an object of the invention to permit mobile and user-configurable inter-network communication.

It is another object of the invention to provide a user-friendly apparatus for communicating over a first network using a first data format, and for enabling interconnection to other devices communicating over another network using a second data format.

To this end, the mobile apparatus comprises first interface means for communicating over a first communication network using a first data format. The apparatus also comprises second interface means for communicating over a second communication network using a second data format. The apparatus comprises processing means being coupled to the first and second interface means. Processing means is configurable to forward data received from the first network to the second network after conversion of the received data from the first format to the second format.

An apparatus of the invention can be configured beforehand to perform a given task. The task includes converting data, received over the first network, from the first format to the second format, and forwarding the converted data over the second network. According to the invention, inter-network communication is managed locally within the apparatus by the processing means. Processing means may arbitrarily be configured by a user. An apparatus of the invention is of great versatility for a user who desires to automatically forward data objects from one network to another.

BRIEF DESCRIPTION OF THE DRAWINGS

The invention is explained in further detail, by way of example, and with reference to the accompanying drawing wherein.

Elements within the drawing having similar or corresponding features are identified by like reference numerals.

PREFERRED EMBODIMENT

Figure 1:
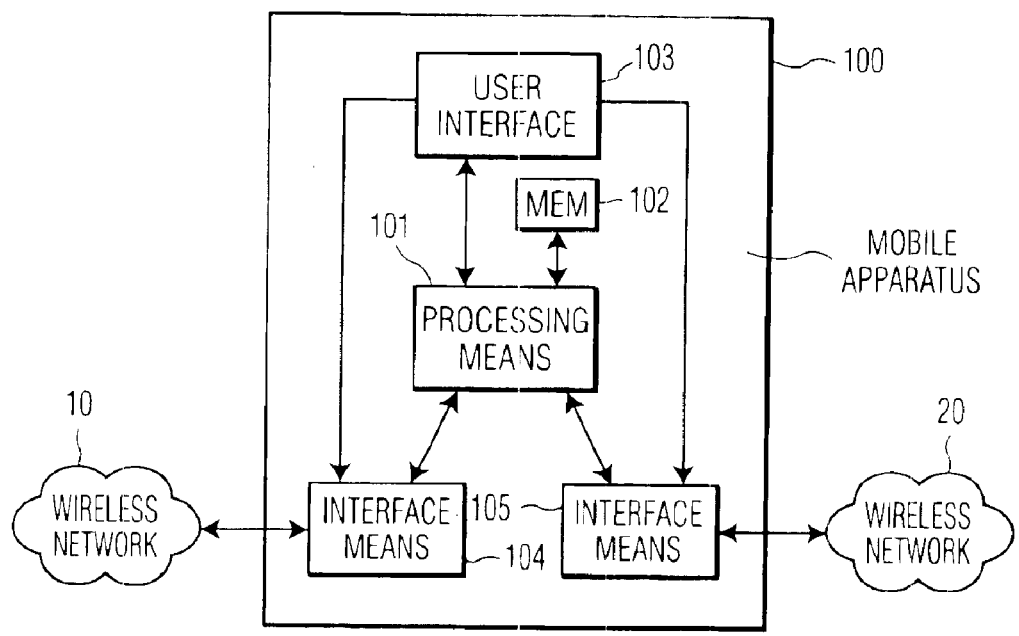
FIG. 1 is a functional block diagram of an apparatus of the invention.

FIG. 1 is a functional block diagram of a mobile apparatus 100 of the invention. The apparatus 100 comprises first interface means 104 for exchanging data of a first format with another device over a first wireless network 10. The apparatus 100 is comprised in the network 10. Interface means 104 may be a wireless transceiver such as a mobile radio transceiver. The first format is defined by intrinsic requirements of the network 10. The network 10 is for example a wireless telephony network such as a GSM network.

The apparatus 100 comprises second interface means 105 for exchanging data of a second format with another device over a second wireless network 20. The apparatus 100 is comprised in the network 20. The second format is defined by intrinsic requirements of the network 20. For example, the network 20 is a WPAN defined in a Bluetooth environment.

The apparatus 100 further comprises processing means 101 and two internal circuits: a user interface 103 and a memory unit 102. Processing means 101 is coupled with interface means 104 and 105, the memory 102 and the user interface 103.

Processing means 101 can be configured by means of control commands C1, . . . , Cn to perform respective tasks. For example, in response to a first control command C1, processing means 101 is configured, in a first step, to convert data of the first format received by first interface means 104 to data of the second format. Processing means 101 is also configured, in a second step, to forward converted data to the second network 20 by transmitting converted data to second interface means 105. Similarly, in response to a second control command C2, e.g., processing means 101 is configured to convert data received from the user interface 103 into data of the second format. Processing means 101 is also configured to forward converted data to the second network 20. It is also within the scope of the invention to contemplate other scenarios comprising both steps of converting received data of a given format to another data format and forwarding converted data to one of the two networks, or, to one or both internal circuits 103 or 102 of the apparatus 100.

Figure 2:
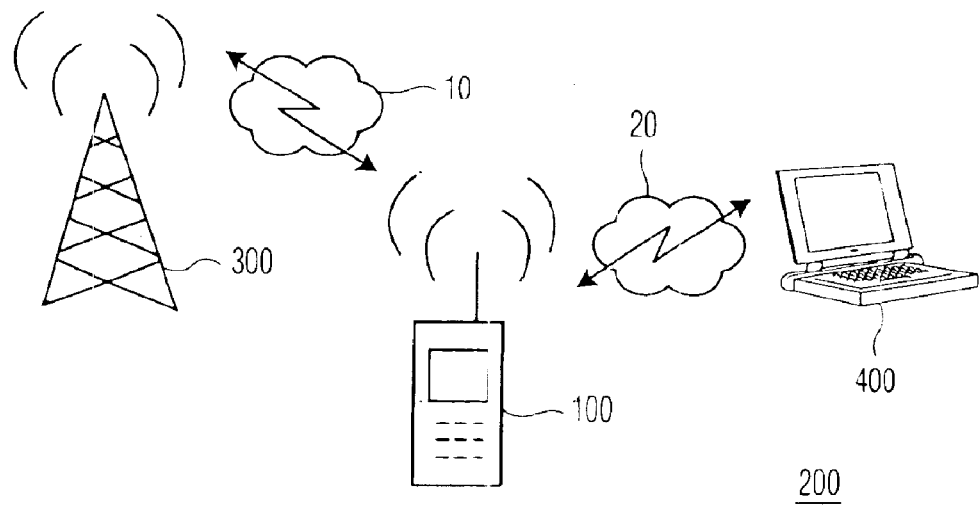
FIG. 2 is a communication system of the invention.

FIG. 2 is an example of a communication system 200 of the invention. The system 200 comprises the apparatus 100 of the invention. In this embodiment, the apparatus 100 is a mobile radiotelephone. The system 200 further comprises a radio telephony base station 300 for exchanging data of the first format with the phone 100 over the network 10. The system 200 also comprises a device 400 for exchanging data of the second format with the phone 100 over the network 20. In this embodiment the device 400 is, for example, a personal computer within the WPAN 20. The system 200 of the invention may also comprise other devices than the computer 400 and the base station 300 in the WPAN 20 and in the network 10, respectively, with which the phone 100 may communicate.

Figure 3:
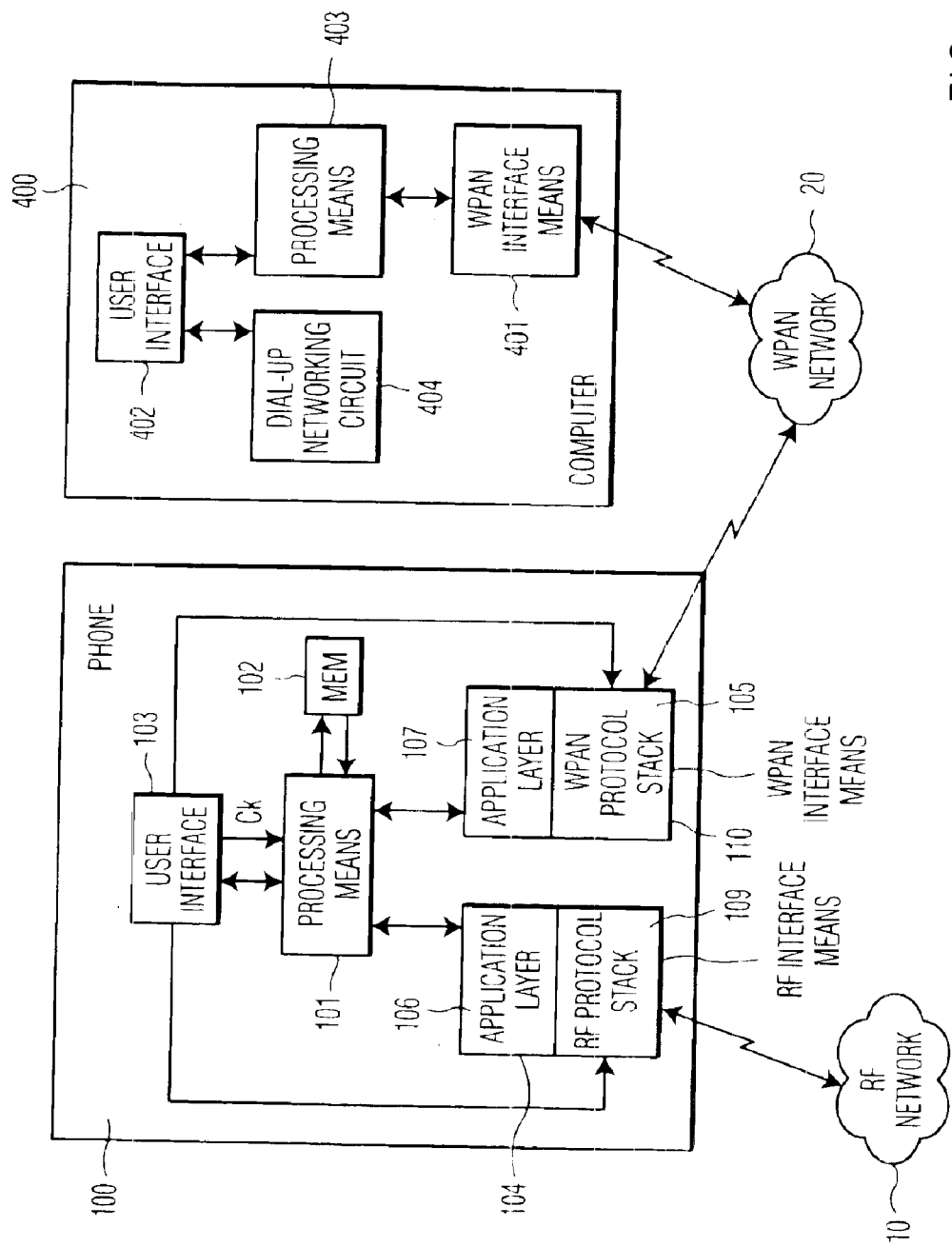
FIG. 3 is a communication system of the invention.

FIG. 3 is a block diagram of a communication system 200 of the invention. The phone 100 is comprised in the network 10, e.g., a GSM network. The phone 100 may send or receive, over the GSM network 10, data of the first format defined by the GSM standard. Such data is voice data of a phone call or a short message service (SMS) message. In the following, reception and transmission of SMS messages is an illustrative example. Interface means 104 of the phone 100 comprises a RF protocol stack 109 composed of the 6 well-known OSI layers (Open System Reference model of layers): the physical layer, the data link layer, the network layer, the transport layer, the session layer and the presentation layer. The protocol stack 109 receives and sends SMS messages over the GSM network 10. Interface means 104 also comprises an OSI application layer 106. A SMS message sent by another device over the network 10 to the phone 100 is received by the stack 109 of interface means 104. The layer 106 extracts, from the stack 109, data related to the reception of the SMS message. Such data related to the reception of a SMS message can be an address of a sender, the time the message was sent and the message itself. When a SMS message is sent by the phone 100 to another device over the network 10, the SMS message is sent by interface means 104 over the network 10. The layer 106 provides the stack 109 with data related to the transmission of the SMS message over the network 10. Such data related to the transmission of a SMS message can be a destination address, the time the message is sent and the message itself.

The personal computer 400 and the phone 100 communicate with each other over the network 20. In this embodiment, the network 20 is a WPAN. The phone 100 and the computer 400 exchange messages of the second data format. These messages of the second format, that have the so-called vMessage format as defined in the cited IrMC specification, pp. 73–81, are transmitted over the WPAN 20 but any other format, that is appropriate for data transmission over the WPAN 20, may also be used. Interface means 105 comprises a WPAN protocol stack 110 for receiving and sending vMessage messages over the WPAN 20. Interface means 105 also comprises an application layer 107. A vMessage message received by the phone 100 is received by the stack 110 of interface means 105. The layer 107 extracts, from the stack 110, data related to the reception of the vMessage message. Such data related to the reception of a vMessage message can be an address of a sender, the time the message was sent and the message itself. When a vMessage message is sent by the phone 100 over the WPAN 20, the layer 107 provides the stack 110 with data related to the transmission of the vMessage message over the WPAN 20. Such data related to the transmission of a vMmessage message can be a destination address, the time the message is sent and the message itself.

The phone 100 further comprises processing means 101, the memory 102 and the user interface 103 as mentioned previously. The memory 102 stores data related to previous communications of the apparatus 100 over the GSM network 10 and the WPAN 20. For example, the memory 102 stores data related to previous receptions and transmissions of SMS messages over the GSM network 10 and data related to previous receptions and transmissions of vMessage messages over the WPAN 20. These data related to vMessage and SMS messages may be stored in a third data format different from the second and first data formats. The memory 102 receives and supplies data of the third format to processing means 101.

The user interface 103 comprises a microphone, a keyboard and a visual display, which can be used for retrieving and reading received messages, and writing messages to be sent over one of the two networks 10 and 20. In accordance with the invention, the user interface 103 is also used by a user to configure the phone 100. Indeed the user enters a control command C1, . . . , Cn using the user interface 103 and the control command is sent to processing means 101 for configuration as described hereinafter. In this embodiment, the user interface 103 receives and sends data of the third format to processing means 101.

As mentioned above, processing means 101 is configured to perform a respective task in response to a respective control command Ck. In this embodiment, the control command Ck issues from the user interface 103 when a user requires processing means 101 to perform a specific task. This can be done, for example, by the user pressing specific keys of a keyboard of the phone 100 or by means of a voice activated protocol within the interface 103. In another embodiment, the control command Ck is received by interface means 104 or 105 from another device in the GSM network 10 or in the WPAN 20, respectively.

In an embodiment, processing means 101 is configured to perform a specific task in response to the received third control command C3. In response to the received control command C3, processing means 101 is configured to automatically convert received first data D1 to second data D2 of third format. First data D1 may be of either one of the first and second formats depending whether first data D1 relates to data received by interface means 104 or 105, respectively. Processing means 101 is then configured to automatically forward second data D2 of the third format to the user interface 103 and the memory 102.

In this embodiment, interface means 104 receives a SMS message sent by another device over the GSM network 10. Interface means 104 transmits first data D1 related to the reception of the SMS message to processing means 101. As mentioned above, processing means 101 has been configured by means of the control command C3. Thus, processing means 101 converts first data D1, of first format in this case, into second data D2 of third format. In this embodiment, the third format is an appropriate data format for internal data communication among the various internal circuits 102 and 103 of the phone 100. Processing means 101 is then configured to forward second data D2 to the memory 102, where second data D2 is stored. In addition, processing means 101 may also convert first data D1 into third data D3 of the third format. Processing means 101, then, forwards third data D3 to the user interface 103, in response to which the user interface 103 notifies the user that a SMS message has been received. Data D2 and D3 may also be identical and the user interface 103 and the memory 102 receive same second data D2. However, the memory 102 and the user interface 103 have specific communication protocols. Indeed, in response to received second data D2, the memory 102 stores second data D2 and the user interface 103 ignores content of second data D2 and simply notifies the user that a message has been received. Second data D2 in the memory 102 may, then, be retrieved by a user in response to a specific request of the user using the interface 103.

Similarly, when interface means 105 receives a vMessage message transmitted over the WPAN network 20, interface means 105 automatically transmits to processing means 101 first data D1 related to the reception of the vMessage message. In the same manner as for the received SMS message, processing means 101 converts first data D1 to second data D2 and forwards second data D2 to the memory 102 and the user interface 103.

In an embodiment of the invention, data D2 and D3 may obtained by totally or partly converting first data D1 to a format, which is appropriate to the circuit in the phone 100, to which data D2 and D3 are forwarded. Data D2 and D3 may also be obtained from a defined communication protocol between processing means 101 and the memory 102 and the user interface 103. In this embodiment, when receiving first data D1, processing means 101 generates third data D3, which, when transmitted to interface 103, results only in the notification to the user that a message was received, e.g. display of a graphical representation of an envelope on the display of the user interface 103. In this example, third data D3 forwarded by processing means 101 do not necessarily give indication of information content of first data D1. Third data D3 may be common data for any message or data object received by interface means 104 and 105.

Such a configuration of processing means 101 allows a user to direct to the phone 100 any data objects transmitted over the GSM network 10 and the WPAN 20. The computer 400 may then be configured to send a vMessage to the phone 100 whenever the computer 400 receives an e-mail. Thus, when the phone 100 has been configured beforehand, by means of the command C3 to perform the task described above, the user is informed on the phone 100 when an e-mail is received on the computer 400.

In FIG. 3 the computer 400 comprises a user interface 402. The user interface 402 permits a user to communicate with the computer 400. The interface 402 comprises a keyboard and a screen. The computer 400 comprises vMessage processing means 403 and WPAN interface means 401. Interface means 401 allows the computer 400 to communicate with the phone 100 and any other device in the network 20. When a VMessage is received by interface means 401, processing means 403 generates and transmits data related to the received vMessage to the user interface 402 to indicate the user that a vMessage was received. In a reverse direction, a user sends data from the computer 400 over the network 20 using the user interface 402, processing means 403 and finally interface means 401. The computer 400 receives emails transmitted over another network by means of a dial-up networking circuit 404. Thus, when the e-mail is received through the circuit 404, the user interface 402, processing means 403 and interface means 401 are configured to generate and transmit the vMessage to the phone 100.

Processing means 101 may then be configured to perform another task by means of the first control command C1 as mentioned earlier. When processing means 101 receives first data D1 from interface means 104, processing means 101 converts received first data D1 of the first format to second data D2 of the second format and forwards second data D2 to interface means 105 and the network 20. This configuration allows the user to redirect any message received by the phone 100 over the network 10 to the personal computer 400. When a SMS message is received by the stack 109 of the phone 100, interface means 104 automatically transmits first data D1 related to the reception of the SMS message. Processing means 101 has been configured to perform the first task. As a result, in response to the received first data D1, processing means 101 converts first data D1 to second data D2. Second data D2 can comprise, using the second format, information content of the SMS message itself, the address of the sender of the SMS message and the time the SMS message was originally received. Second data D2 is then forwarded to interface means 105 for transmission of a vMessage message over the WPAN 20. Interface means 105, automatically transmits the vMessage message over the WPAN 20 to the computer 400. This configuration allows a user to retrieve on the computer 400 any message object received by the phone 100 over the GSM network.

It is to be noted that, with respect to the described apparatus, modifications or improvements may be proposed without departing from the scope of the invention. For instance, it is clear that this apparatus may be implemented in several manners, such as by means of wired electronic circuits or, alternatively, by means of a set of instructions stored in a computer-readable medium, said instructions replacing at least a part of said circuits and being executable under the control of a computer or a digital processor in order to carry out the same functions as fulfilled in said replaced circuits.

It is also noted that the word "comprising" in a claim does not exclude the presence of other elements than those listed in this claim.

What is claimed is:

1. A mobile apparatus comprising:
   first interface means for communicating over a first communication network using a first data format;
   second interface means for communicating over a second communication network using a second data format;
   a processor; and
   a user interface for exchanging data of a third format with a user, and,
   wherein,
   the processor is:
      coupled to the first and second interface means,
      configurable to forward first data received from the first network to the second network after conversion of the received first data from the first format to the second format, and
      configurable to forward third data received from either one of the first network and the second network to the user interface after conversion of the received third data to the third format.

2. The mobile apparatus of claim 1, wherein
   the processor is configured by data received from either one of the first and the second communication networks.

3. The mobile apparatus of claim 1, further comprising a memory arrangement for storing the converted third data of the third format.

4. The apparatus of claim 1, wherein the processor is configurable to forward second data received from the second network to the first network after conversion of the received second data from the second format to the first format.

5. The apparatus of claim 1, wherein the received first data is text message data.

6. The apparatus of claim 1, wherein
the first communication network is a radio telephony network.

7. The apparatus of claim 1, wherein
the first data format is a Short Message Service data format.

8. The apparatus of claim 1, wherein
the second communication network is a Personal Access Network.

9. The mobile apparatus of claim 1, wherein
the processor is configured by a user.

* * * * *

US007096033C2

(12) INTER PARTES REEXAMINATION CERTIFICATE (1136th)
United States Patent
Bell

(10) Number: US 7,096,033 C2
(45) Certificate Issued: Jul. 7, 2015

(54) MOBILE APPARATUS FOR ENABLING INTER-NETWORK COMMUNICATION

(75) Inventor: John Richardson Bell, Fremont, CA (US)

(73) Assignee: MOBILE ENHANCEMENT SOLUTIONS LLC, Frisco, TX (US)

Reexamination Request:
No. 95/002,404, Sep. 15, 2012

Reexamination Certificate for:
Patent No.: 7,096,033
Issued: Aug. 22, 2006
Appl. No.: 09/618,190
Filed: Jul. 18, 2000

Reexamination Certificate C1 7,096,033 issued Jun. 4, 2013

(51) Int. Cl.
*H04M 3/00* (2006.01)
*H04L 29/06* (2006.01)
*H04M 1/725* (2006.01)
*H04W 88/02* (2009.01)

(52) U.S. Cl.
CPC ............ *H04L 29/06* (2013.01); *H04M 1/7253* (2013.01); *H04M 1/72547* (2013.01); *H04W 88/02* (2013.01); *H04L 69/18* (2013.01); *H04M 2250/02* (2013.01)

(58) Field of Classification Search
None
See application file for complete search history.

(56) References Cited

To view the complete listing of prior art documents cited during the proceeding for Reexamination Control Number 95/002,404, please refer to the USPTO's public Patent Application Information Retrieval (PAIR) system under the Display References tab.

*Primary Examiner* — Charles Craver

(57) ABSTRACT

A mobile apparatus is provided for exchanging data objects over several network. The mobile apparatus exchanges data objects of a first data format over a first network and exchanges data of a second data format over a second network. The mobile apparatus comprises configurable processing means. When configured, processing means converts data of the first format received from the first network to data of the second format. Processing means then forwards converted data to the second network.

**Attention is directed to the decision of *Mobile Enhancement Solutions Llc* v. *HTC Corporation et al*, US Dist Texas Northern (Dallas) 3:12cv794; *Mobile Enhancement Solutions Llc* v. *Apple Inc. et al*, US Dist Texas Northern (Dallas) 3:12cv795; *Mobile Enhancement Solutions Llc* v. *Motorola Mobility Llc et al*, US Dist Texas Northern (Dallas) 3:12cv797. This reexamination may not have resolved all questions raised by these decisions. See 37 CFR 1.552 (c) for *ex parte* reexamination and 37 CFR 1.906(c) for *inter partes* reexamination.**

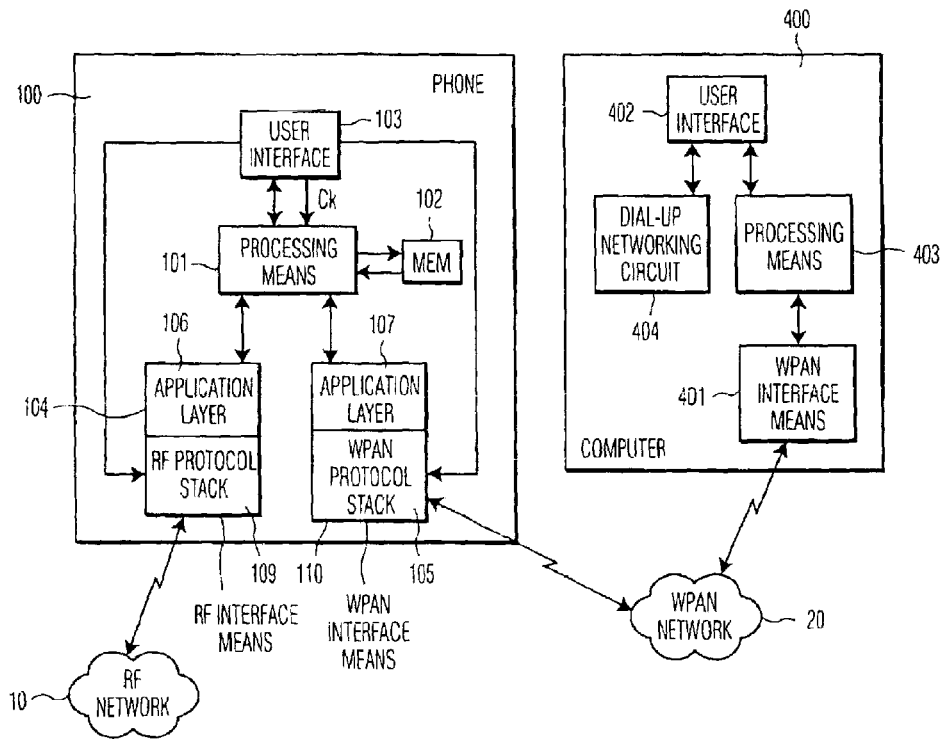

INTER PARTES REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-9 are cancelled.

\* \* \* \* \*